UNITED STATES PATENT OFFICE.

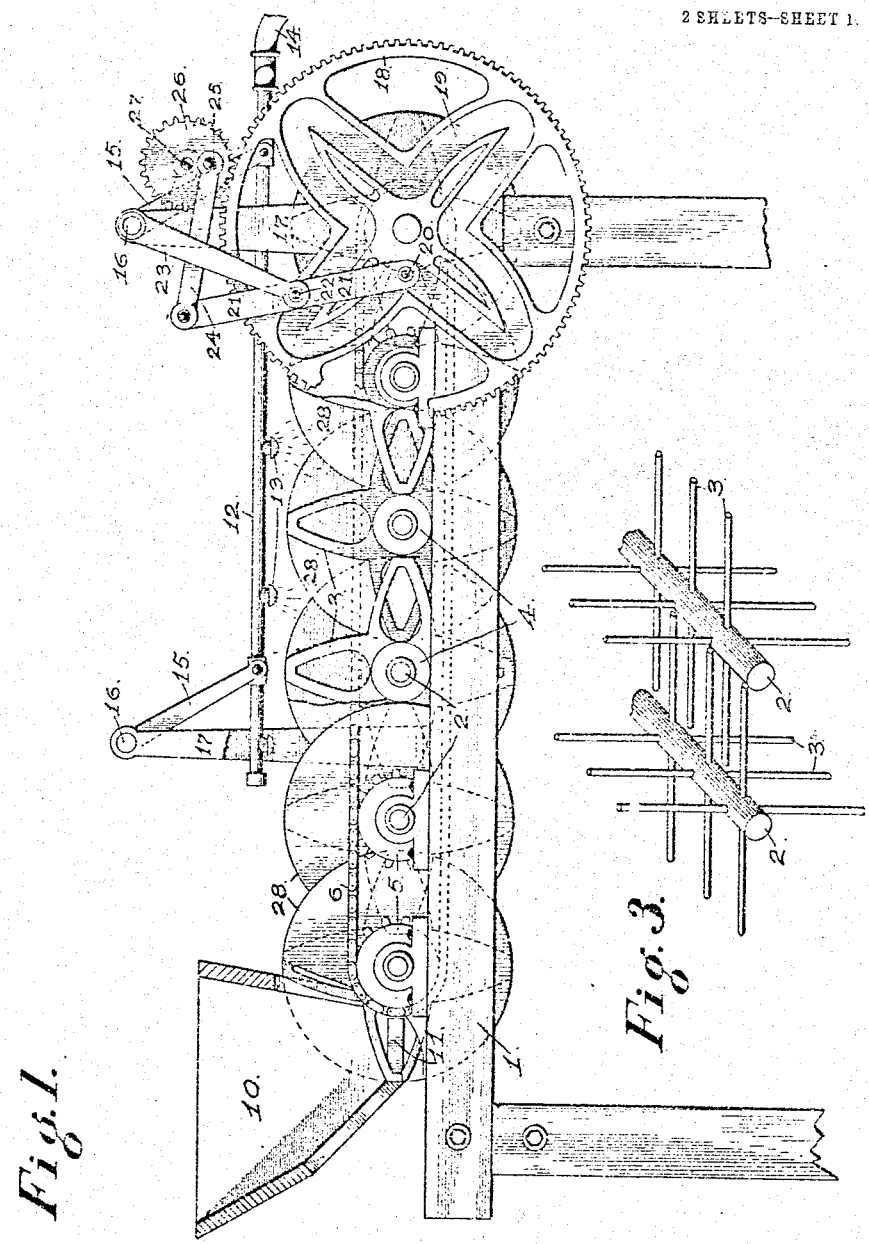

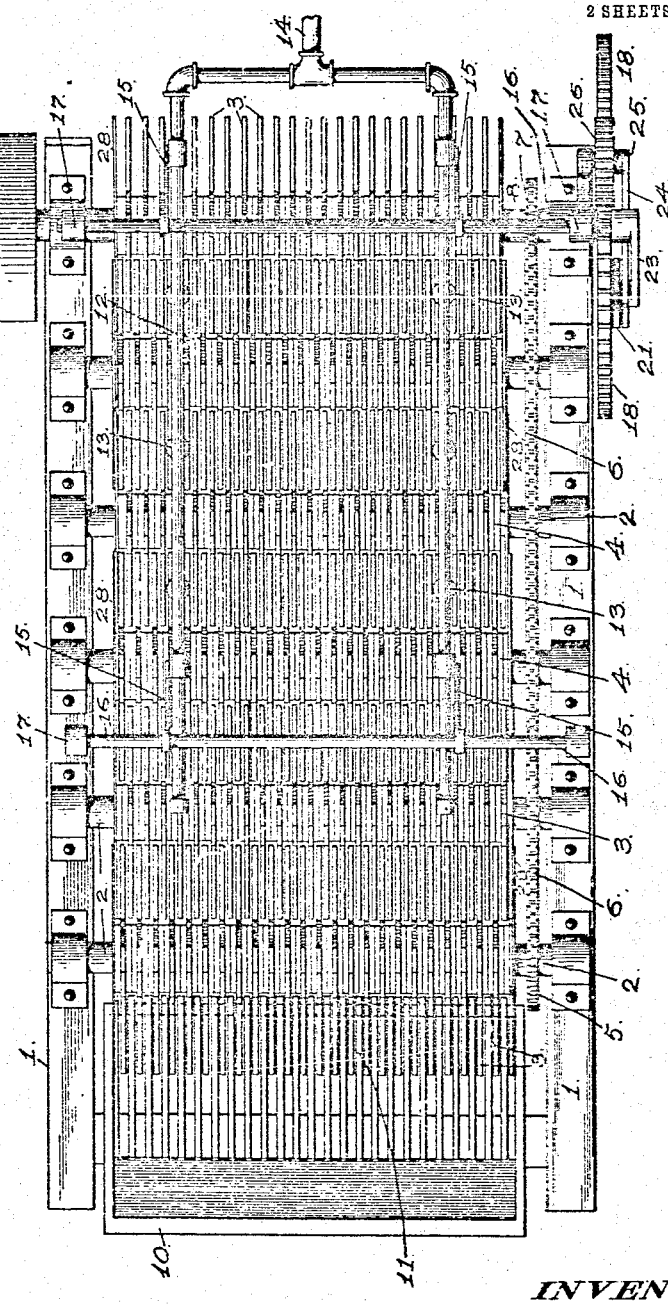

WILLIAM C. ANDERSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

CONVEYER.

1,012,046.  Specification of Letters Patent.  Patented Dec. 19, 1911.

Application filed February 7, 1908. Serial No. 414,818.

*To all whom it may concern:*

Be it known that I, WILLIAM C. ANDERSON, a citizen of the United States, residing at San Jose, in the county of Santa Clara and State of California, have invented certain new and useful Improvements in Conveyers, of which the following is a specification.

My invention relates to the class of conveyers especially for use in and adapted for machines for treating, grading, processing or otherwise manipulating fruit, vegetables, nuts, and any material upon which some operation is to be performed during its advancement through the machine.

My invention is particularly adapted for the handling of material upon which such operation is to be performed, during its travel, which requires a loosening up of the material, as for separation; or the turning over and over of the components of the material, as for effective washing; or the turning of peaches, to subject them all over their surface, to the action of jets or sprays of water in order to remove their previously disintegrated skins; or the agitation of prunes and nuts, to effectively grade them according to size. I do not, however, confine myself to these uses, but, for the sake of illustration, I show and describe my conveyer in connection with an apparatus suitable for removing the previously disintegrated skins of peaches, by means of jets or sprays of water; and, also, for further illustration, I indicate its use as a grader for any material requiring a sizing separation.

The main object of my invention is to provide for the most effective loosening up and turning of the material, during its advancement, so that its components shall be presented to the best advantage to whatever operation or manipulation is to be performed upon them; and, to this end, my invention consists, in the novel conveyer or carrier which I shall hereinafter fully describe.

In the accompanying drawings, to which reference is hereby made, Figure 1 is a side elevation, partly in section and broken, of a machine embodying my novel carrier. Fig. 2 is a plan of the same. Fig. 3 is a fragmentary detail, showing the intercurrent fingers adapted to form a grader conveyer or carrier.

1 is a suitable frame upon which are mounted the parallel rolls 2 in any suitable number, forming a linear series. Each roll has spaced fingers 3 which are so arranged that the fingers of one roll pass, by the rotation of said roll, between and through the interdigital spaces of the adjacent rolls, and may, therefore, properly be termed intercurrent fingers. The fingers 3 may be formed with or attached to the rolls in any suitable manner, as, for example, each finger or each circumferential group of fingers may have a hub 4 by which it is fitted upon and may be clamped or fastened to the roll, said hub serving also to space the fingers in circumferential series on the roll. The hub 4 may carry one or more fingers. I have here shown four fingers in each circumferential group, though more or fewer may be used. The fingers may be of any suitable form or shape, with surfaces curved or straight, and the interdigital spaces separating the groups may bear any proportion to the width of the fingers themselves as may be required for the particular use of the device and the particular character of the material being treated, however, the special construction of the fingers illustrated in Figs. 1 and 2 of the drawing is considered to be particularly desirable and advantageous in some cases, said fingers tapering toward their outer ends and having oppositely curved material engaging edges. All the rolls 2 are caused to rotate in the same direction, by any suitable means. I have here shown sprockets 5 on the end of each roll, and a chain 6 for driving the sprockets, said chain being itself driven by a sprocket 7 on a shaft 8 having a drive-pulley 9.

10 represents an inclined feeder, the base 11 of which is horizontal and is digitated, said base lying in the line of the rolls 2, and so arranged that the fingers of the first roll pass up between the spaces of the feeder-base and will take the material therefrom.

Before describing the particular use for which the machine as here illustrated is intended, I will point out the operation of these fingered rolls as applied to any use. Together, in linear series, these rolls with their intercurrent fingers, form a carrier or conveyer adapted to receive material at one point and transfer it to another point. The material, such as fruit, vegetables, nuts, and the like, passes down the inclined feeder 10 and rests momentarily on the digitated delivery edge or base 11 of said feeder. Immediately, the fingers of one row of the first roll rise through said base and pick up the material and carry or roll it forwardly a distance equal to the diameter of the circle of action of the first roll. As these fingers, with their material, arrive at a horizontal on their downward path, the fingers of a row of the second roll have arrived at a horizontal on their upward path. The two rows are momentarily in the same plane and form a surface for the material. But as the finger row of the second roll rises, its fingers pick up the material, and again it is advanced through a distance equal to the field of action of the second roll, and there it meets the fingers of a row of the third roll, by which it is once more picked up and advanced, and so forth throughout the whole series. In this course of travel the material is kept well loosened and each individual component is turned over and over, but gently, and without injury; and the interdigital spaces are kept clear and there will be no clogging. The advantage of such a carrier or conveyer is well illustrated in machines for washing or otherwise treating the material, either by passing through a body of water or other liquid, or by spraying water upon it, either for mere washing, or for the purpose, by means of jets or sprays of water under pressure, of removing the previously disintegrated skin of such fruit as peaches, for example, which require to be turned over and over in order to present all sides and surfaces to the peeling jets. It is in this last connection that I here show said carrier.

12 represents a water pipe, provided with spray nozzles 13. This pipe receives its water from any suitable source, through a flexible connection 14. The water pipe is suspended by hangers 15 from cross rock-shafts 16, carried in the upper ends of standards 17 rising from the frame 1, so that by the rocking movement of these cross-shafts, the water pipe may be vibrated in the direction of the travel of the peaches on the carrier. The object of this is to cause the water-jets to follow the peaches, so that the water will continue to play on them, and as little as possible be wasted; and to insure this economy, I provide for timing the movement of the water-jets to the movement of the peaches, and a quick return of said jets to their initial position, to again follow the next advancing row of fruit. This is done as follows. Upon the drive shaft 8 is a gear wheel 18 which carries or is formed with a four-pointed cam 19. In this cam plays a roller-stud 20 on the lower end of a lever 21 which is pivoted at 22 to a crank-arm 23, said arm being secured at its upper end to the rock-shaft 16 at the foot of the machine. The upper end of the lever 21 is connected by a link 24 to a crank-pin 25 on a small pinion 26 mounted on a shaft 27 journaled in bearings on the standard 17. The pinion 26 meshes with the large gear 18.

From this construction, it will be seen, that the water-pipe has imparted to it a vibration in the direction of travel of the peaches, and, from the shape of the cam 19 with its relatively longer and shorter inner and outer courses, it is apparent that the water-pipe in its movement toward the foot of the machine will have a relatively slower speed and can be timed to the travel of the peaches, thereby causing its jets to follow them, and in its return movement said pipe will have a relatively quicker speed; and, finally, it will be observed, that by means of the small pinion 26 and its crank and compound lever connection with the arm 23 of the rock-shaft, the water-pipe, during its main reciprocation, has imparted to it a quick shaking movement, which is of advantage in playing its jets on the peaches.

Returning to the conveyer or carrier formed by the rolls 2 with their intercurrent fingers 3, it must be noted that instead of having fixed side-guards between which it operates, I provide for a reduction of friction and the elimination of possible injury to the fruit along the edges of the conveyer, by making these side-guards themselves movable, thereby forming, as it were, hopper sides, which travel in the same direction as the fingered-rolls. This is effected by the solid disks 28 on the ends of the rolls 2. These disks overlap in series, and will be made of thin metal, so that they will readily adjust themselves with relation to each other.

The use of the carrier as a grader is illustrated in the fragmentary detail in Fig. 3, wherein the intercurring fingers are narrow compared with the interdigital spaces, so that the prunes or nuts or other material will be separated according to size, the smaller dropping through, while the larger will be carried along to the foot of the machine.

Having thus described my invention, what I claim as new and desire to secure by Letters Patent is—

1. A carrier to support and advance material comprising a series of rotatable rolls with intercurrent fingers, a feeder having a terminal material supporting edge formed of fingers so spaced with relation to the fingers of the adjacent carrier roll that the fingers of said carrier roll are adapted to pass through the spaces between the fingers of the feeder and lift the material therefrom.

2. The combination of a carrier, a feeder having a digitated terminal material supporting edge and a rotatable roll disposed between the carrier and feeder, said roll having a plurality of closely associated elongated fingers adapted to pass between the spaces of the terminal edge of the feeder to take up the material therefrom and transfer it to the carrier, said fingers having curved edges and a substantially flat end.

3. A material supporting carrier composed of a linear series of rotatable rolls with intercurrent fingers, and solid disks on the ends of and rotating with said rolls, and overlapping each other to form moving side guards for said carrier.

4. A material supporting carrier and guards extending along the sides of the carrier, each comprising a plurality of rotatable members overlapping each other.

In testimony whereof I have signed my name to this specification in the presence of two subscribing witnesses.

WILLIAM C. ANDERSON.

Witnesses:
 WM. F. BOOTH,
 D. B. RICHARDS.